Oct. 19, 1937.  E. G. MUELLER  2,096,464
BRAKE RIGGING
Filed July 25, 1936
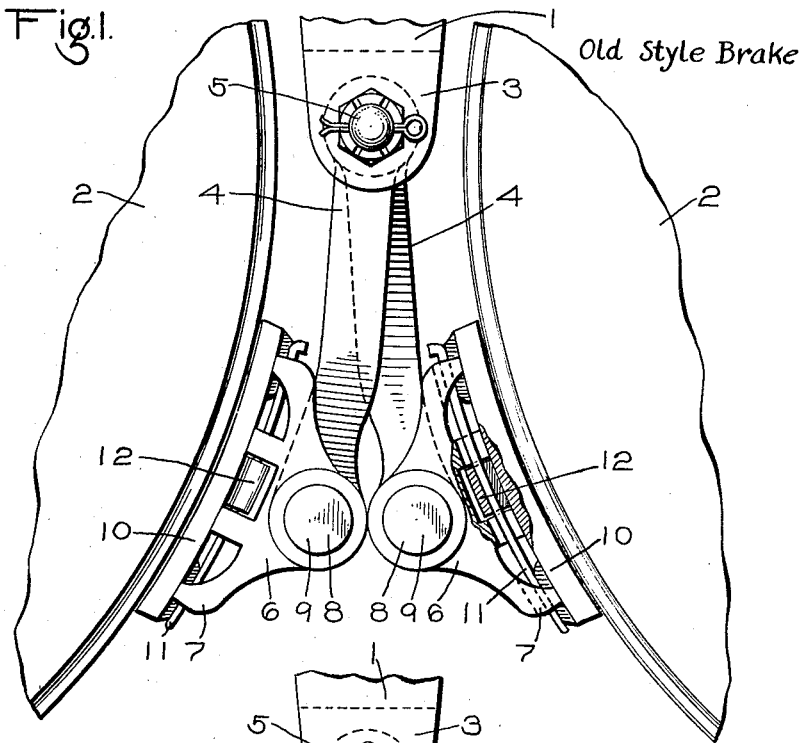
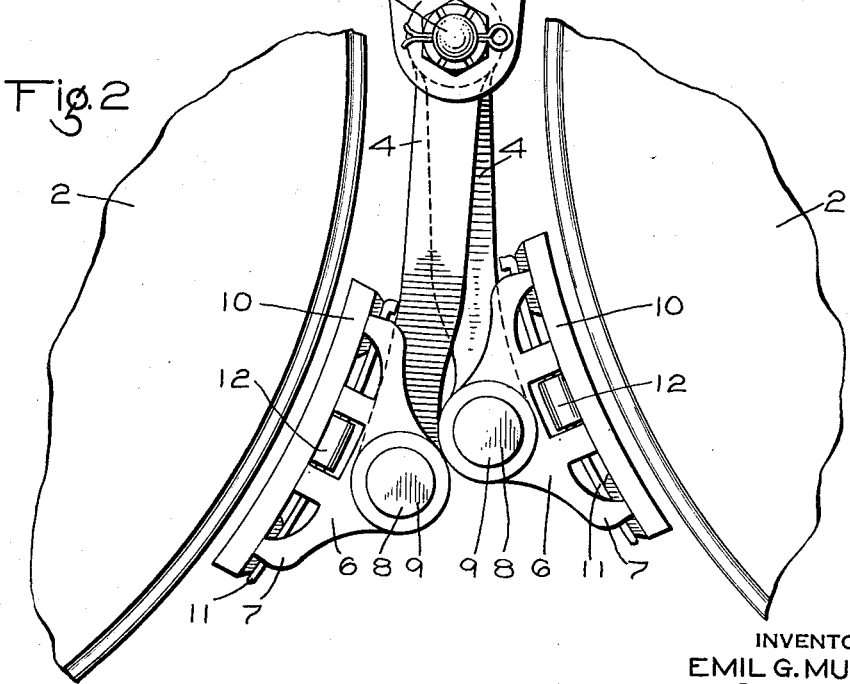
INVENTOR
EMIL G. MUELLER
BY *Wm. M. Cady*
ATTORNEY Patented Oct. 19, 1937

2,096,464

UNITED STATES PATENT OFFICE 2,096,464

BRAKE RIGGING

Emil G. Mueller, Swissvale, Pa., assignor to The American Brake Company, Wilmerding, Pa., a corporation of Missouri Application July 25, 1936, Serial No. 92,577

2 Claims. (Cl. 188—52)

This invention relates to brake rigging for railway vehicles.

In railway vehicles, such as locomotives, it is the practice to dispose adjacent driver wheels, located at each side of the locomotive frame, as close to each other as practicable. When clasp brakes are to be employed on the locomotive, the space between adjacent wheels is sufficient to permit two adjacent oppositely swinging brake heads of a clasp brake rigging to move to their normal brake release position, but is not sufficient to permit new brake shoes to be substituted for worn shoes without first removing the brake heads from their hangers and brake beams.

In my application Serial No. 92,576 filed July 25, 1936, it is disclosed how this difficulty may be eliminated by the provision of brake beam extensions which are made of considerably less diameter than that of the end portions of the usual brake beams, which permit the brake heads to be made shallow enough to provide the necessary clearance between each brake head and its respective wheel to permit a new brake shoe to pass therebetween when replacing a worn shoe by a new one.

The principal object of the invention is to provide means whereby the above mentioned difficulty is eliminated without increasing the space between adjacent wheels and without changing the dimensions of the usual brake heads and without reducing the diameter of the ends of the brake beams.

This object is attained by arranging the two adjacent brake heads in such a manner that one will be slightly higher than the other so that the backs thereof will nest together sufficiently to provide the necessary clearance between the heads and the treads of the respective wheels to permit new brake shoes to be applied to their heads without disconnecting the heads from the brake beams and hangers.

Other objects and advantages will appear in the following more detailed description of the invention.

In the accompanying drawing Fig. 1 is a fragmentary side elevational view of a vehicle having a brake rigging in which two adjacent brake shoe heads located between adjacent wheels are arranged in the usual manner, which view illustrates how the backs of the brake heads engage each other and thereby prevent sufficient clearance from being obtained to permit new brake shoes to be applied to the heads while the heads are mounted on the brake beams, and Fig. 2 is a similar view of a vehicle having a brake rigging embodying the invention.

In the drawing, the invention is shown in connection with a locomotive having a supporting frame 1 which is carried by wheels 2 in the usual manner. The construction of a locomotive is so well known that only two of the wheels at one side of the locomotive and a small portion of the locomotive frame are all that is deemed necessary to show for a clear understanding of the invention.

Between the adjacent wheels 2, the locomotive frame is provided with a downwardly depending lug 3 to which the upper ends of a pair of brake beam hangers 4 are pivotally connected by means of a transversely extending pivot pin 5.

The lower end of each hanger extends between the usual spaced flanges 6 on the back of the ordinary brake head 7, and supports one end of a transversely extending brake beam 8 and thereby the brake head which is mounted on the round end portion 9 of the brake beam which portion is of the usual diameter.

The brake beams 8 are so arranged that one is in a higher horizontal plane than the other and consequently the brake heads will be staggered with relation to each other in the direction of the height of the wheels 2 so that the backs of the brake heads, i. e., the adjacent back portions of the flanges 6 of the heads are adapted to nest one within the other a sufficient distance as shown in Fig. 2 to provide the desired clearance between the brake heads and the respective treads of the wheels.

Each brake head 7 carries a removable brake shoe 10 which is attached to the head by means of a removable key 11 in the usual well known manner, which key engages the brake head and a lug 12 on the back of the brake shoe, the lug being provided with an opening to accommodate the key.

The brake beams, brake heads and brake shoes are adapted to be moved to their braking and brake releasing position by means of any suitable system of brake levers and rods but since these parts form no part of the present invention they have not been shown in the drawing.

From an inspection of Fig. 1 it will be seen that with the brake shoes and brake beams arranged in the same horizontal plane, the backs of the brake shoes engage each other and prevent sufficient clearance from being obtained between each brake head and tread of its respective wheel to permit the lug 12 on a new shoe to clear the brake head, however, with the brake beams and heads arranged as shown in Fig. 2 so as to permit the backs of the brake shoes to nest slightly within each other sufficient clearance is obtained to permit the application of new shoes to the heads. If greater clearance than that shown is desired the length of the longest hanger may be increased or the length of the shorter hanger may be decreased. In either case the brake heads will nest deeper in each other and consequently increase the clearance between the brake heads and the treads of the wheels.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. In a brake rigging for a vehicle, in combination, a supporting frame for the vehicle, two relatively closely spaced wheels arranged in longitudinal alignment with each other at one side of the frame, two brake heads located in the space between said wheels and in vertical alignment with said wheels, each of said shoes being pivotally supported from said frame to move toward and from the adjacent wheel, and brake shoes carried by said heads for frictional engagement with said wheels and being removably attached to said heads, said heads being arranged in different horizontal planes to permit them to nest within each other when they are moved away from said wheels to provide sufficient clearance between said heads and wheels to permit a new shoe to be applied to each of said heads.

2. In a brake rigging for a vehicle, in combination, a supporting frame for the vehicle, two relatively closely spaced wheels arranged in longitudinal alignment with each other at one side of the frame, two brake heads located in the space between said wheels and in vertical alignment with said wheels, each of said shoes being pivotally supported from said frame to move toward and from the adjacent wheel, and brake shoes carried by said heads for frictional engagement with said wheels and being removably attached to said heads, said heads being staggered in height relative to each other to permit the backs thereof to overlap each other to provide sufficient clearance between said heads and wheels to permit a new brake shoe to be applied to each of said heads without interference by the head or wheel.

EMIL G. MUELLER.